(12) United States Patent
Jansen et al.

(10) Patent No.: US 9,434,814 B2
(45) Date of Patent: Sep. 6, 2016

(54) UNSATURATED POLYESTER RESIN COMPOSITIONS

(71) Applicant: DSM IP ASSETS B.V., Heerlen (NL)

(72) Inventors: Johan Franz Gradus Antonius Jansen, Geleen (NL); Ronald Ivo Kraeger, Baarn (NL)

(73) Assignee: DSM IP ASSETS B.V., Heerlen (NL)

( * ) Notice: Subject to any disclaimer, the term of this patent is extended or adjusted under 35 U.S.C. 154(b) by 0 days.

(21) Appl. No.: 14/155,811

(22) Filed: Jan. 15, 2014

(65) Prior Publication Data

US 2014/0128553 A1     May 8, 2014

Related U.S. Application Data

(63) Continuation of application No. 12/307,481, filed as application No. PCT/EP2007/005965 on Jul. 5, 2007, now abandoned.

(30) Foreign Application Priority Data

Jul. 6, 2006 (EP) ..................................... 06014013

(51) Int. Cl.
| | |
|---|---|
| *C08G 63/91* | (2006.01) |
| *C08F 283/01* | (2006.01) |
| *C08K 5/098* | (2006.01) |
| *C08K 5/14* | (2006.01) |
| *C08K 5/17* | (2006.01) |

(52) U.S. Cl.
CPC ............. *C08G 63/91* (2013.01); *C08F 283/01* (2013.01); *C08K 5/098* (2013.01); *C08K 5/14* (2013.01); *C08K 5/17* (2013.01)

(58) Field of Classification Search
CPC ..... C08F 283/01; C08G 63/91; C08K 5/098; C08K 5/14; C08K 5/17
USPC ........ 524/781, 783, 785; 525/437, 445, 447, 525/530, 531; 528/306, 405
See application file for complete search history.

(56) References Cited

U.S. PATENT DOCUMENTS

| | | | |
|---|---|---|---|
| 5,395,865 A | | 3/1995 | Akiyama et al. |
| 5,451,556 A | | 9/1995 | Giovando |
| 6,329,475 B1 | | 12/2001 | Kelly |
| 8,039,559 B2 * | | 10/2011 | Jansen .................. C08F 283/01 524/781 |

FOREIGN PATENT DOCUMENTS

| | | |
|---|---|---|
| EP | 0 113 015 | 7/1984 |
| WO | 90/12824 | 11/1990 |
| WO | 2005/047364 | 5/2005 |

OTHER PUBLICATIONS

International Search Report for PCT/EP2007/005965, mailed Sep. 10, 2007.
Written Opinion of the International Searching Authority for PCT/EP2007/005965, mailed Sep. 10, 2007.

* cited by examiner

*Primary Examiner* — Robert Jones, Jr.
(74) *Attorney, Agent, or Firm* — Nixon & Vanderhye P.C.

(57) ABSTRACT

The present invention relates to a two-component composition comprising a first component and a second component, wherein the first component being a pre-accelerated resin composition comprising an unsaturated polyester resin or vinyl ester resin and a copper$^{2+}$ compound, at least one N-containing organic base selected from an amine compound and/or an ammonium salt; and wherein copper is present in an amount of at least 50 ppm (relative to the primary resin system), wherein the resin composition contains less than 0.01 mmol cobalt per kg primary resin system, the resin composition has an acid value in the range of from 0.001-300 mg KOH/g of resin composition, the molecular weight of the resin containing reactive unsaturations is in the range of from 500 to 200,000 g/mole and wherein the second component comprises a peroxide compound.

19 Claims, No Drawings

UNSATURATED POLYESTER RESIN COMPOSITIONS

This application is a continuation of commonly owned U.S. patent application Ser. No. 12/307,481, filed Oct. 12, 2009 (now abandoned) which is the national phase application of International Application No. PCT/EP2007/005965, filed Jul. 5, 2007, which designated the U.S. and claims priority to EP Application No. 06014013.4, filed Jul. 6, 2006, the entire contents of each of which are hereby incorporated by reference.

The present invention relates to a two-component composition comprising a first component and a second component, wherein the first component being a resin composition comprising an unsaturated polyester resin or vinyl ester resin and the second component comprises a peroxide compound. The resin compositions show good curing properties in the absence of cobalt. The resin compositions also show slight gel-time drift tendency. The present invention further also relates to objects and structural parts prepared from such two component compositions. The present invention finally also relates to methods for radically curing such two-component compositions.

As used herein, the term "two-component system" refers to systems where two separate components (A and B) are being spatially separated from each other, for instance in separate cartridges or the like, and is intended to include any system wherein each of such two separate components (A and B) may contain further separate components. The components are combined at the time the system is used.

As meant herein, objects and structural parts are considered to have a thickness of at least 0.5 mm and appropriate mechanical properties. The term "objects and structural parts" as meant herein also includes cured resin compositions as are used in the field of chemical anchoring, construction, roofing, flooring, windmill blades, containers, tanks, pipes, automotive parts, boats, etc.

As meant herein the term gel-time drift (for a specifically selected period of time, for instance 30 or 60 days) reflects the phenomenon, that—when curing is performed at another point of time than at the reference standard moment for curing, for instance 24 hours after preparation of the resin—the gel time observed is different from that at the point of reference. For unsaturated polyester resins, as can generally be cured under the influence of peroxides, gel time represents the time lapsed in the curing phase of the resin to increase in temperature from 25° C. to 35° C. Normally this corresponds to the time the fluidity (or viscosity) of the resin is still in a range where the resin can be handled easily. In closed mould operations, for instance, this time period is very important to be known. The lower the gel-time drift is, the better predictable the behavior of the resin (and the resulting properties of the cured material) will be.

W. D. Cook et al. in Polym. Int. Vol. 50, 2001, at pages 129-134 describe in an interesting article various aspects of control of gel time and exotherm behavior during cure of unsaturated polyester resins. They also demonstrate how the exotherm behavior during cure of such resins can be followed. FIGS. 2 and 3 of this article show the gel times in the bottom parts of the exotherms measured. Because these authors focus on the exotherms as a whole, they also introduced some correction of the exotherms for heat loss. As can be seen from the figures, however, such correction for heat loss is not relevant for gel times below 100 minutes.

Gel time drift (hereinafter: "Gtd") can be expressed in a formula as follows:

$$Gtd = (T_{25 \to 35° C. \text{ at y-days}} - T_{25 \to 35° C. \text{ after mixing}}) / T_{25 \to 35° C. \text{ after mixing}} \times 100\% \quad \text{(formula 1)}$$

In this formula $T_{25 \to 35° C.}$ (which also might be represented by $T_{gel}$) represents, as mentioned above, the time lapsed in the curing phase of the resin to increase in temperature from 25° C. to 35° C. The additional reference to "at y days" shows after how many days of preparing the resin the curing is effected.

All polyester resins, by their nature, undergo some changes over time from their production till their actual curing. One of the characteristics where such changes become visible is the gel-time drift. The state of the art unsaturated polyester resin systems generally are being cured by means of initiation systems. In general, such unsaturated polyester resin systems are cured under the influence of peroxides and are accelerated (often even pre-accelerated) by the presence of metal compounds, especially cobalt salts, as accelerators. Cobalt naphthenate and cobalt octanoate are the most widely used accelerators. In addition to accelerators, the polyester resins usually also contain inhibitors for ensuring that the resin systems do not gellify prematurely (i.e. that they have a good storage stability). Furthermore, inhibitors are being used to ensure that the resin systems have an appropriate gel time and/or for adjusting the gel-time value of the resin system to an even more suitable value.

Most commonly, in the state of the art, polymerization initiation of unsaturated polyester resins, etc. by redox reactions involving peroxides, is accelerated or pre-accelerated by a cobalt compound in combination with another accelerator.

An excellent review article of M. Malik et al. in J.M.S.—Rev Macromol. Chem. Phys., C40(2 & 3), p. 139-165 (2000) gives a good overview of the current status of resin systems. Curing is addressed in chapter 9. For discussion of control of gel time reference can be made to the article of Cook et al. as has been mentioned above. Said article, however, does not present any hint as to the problems of gel-time drift as are being solved according to the present invention.

The phenomenon of gel-time drift, indeed, so far got quite little attention in the literature. Most attention so far has been given in literature to aspects of acceleration of gel time in general, and to improving of pot-life or shelf life of resins. The latter aspects, however, are not necessarily correlated to aspects of gel-time drift, and so, the literature until now gives very little suggestions as to possible solutions for improvement of (i.e. lowering of) gel-time drift.

Accordingly, for the unsaturated polyester resins and vinyl ester resins as are part of the current state of the art there is still need for finding resin systems showing reduced gel-time drift tendency, or in other words, resin systems having only slight gel-time drift when cured with a peroxide. Preferably the mechanical properties of the resin composition after curing with a peroxide are unaffected (or improved) as a result of the changes in the resin composition for achieving the reduced gel-time drift. Moreover, for environmental reasons, the presence of cobalt in the resins is less preferred.

The present inventors now, surprisingly, found that two-component compositions with good curing properties could be obtained by providing a two-component composition comprising a first component and a second component, wherein the first component being a pre-accelerated resin composition comprising an unsaturated polyester resin or vinyl ester resin and a. a copper$^{2+}$ compound,
b. at least one N-containing organic base selected from an amine compound and/or an ammonium salt; wherein the amine compound having the following formula:

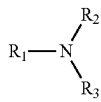

and the ammonium salt having the following formula $R^1R^2R^3N^+H$ whereby $R^1$, $R^2$ and $R^3$ each individually may represent hydrogen (H), $C_1$-$C_{20}$ alkyl, $C_5$-$C_{20}$ cycloalkyl or $C_7$-$C_{20}$ alkylaryl, that each optionally may contain one or more hetero-atoms (e.g. oxygen, phosphor or sulphur atoms) and/or substituents and a ring may be present between $R_1$ and $R_2$, $R_2$ and $R_3$ and/or $R_1$ and $R_3$, which may contain heteroatoms and wherein copper is present in an amount of at least 50 ppm (relative to the primary resin system), wherein the resin composition contains less than 0.01 mmol cobalt per kg primary resin system, the resin composition has an acid value in the range of from 0.001-300 mg KOH/g of resin composition, the molecular weight of the resin containing reactive unsaturations is in the range of from 500 to 200,000 g/mole; and wherein the second component comprises a peroxide compound.

The resin composition of the two-component composition according to the present invention being free of blowing agents.

According to the present invention, compositions having good curing properties can be obtained, i.e. the compositions according to the invention have short gel time, short peak time and/or high peak temperature. In the curing of unsaturated polyester resins or vinyl esters, gel time is a very important characteristic of the curing properties. In addition also the time from reaching the gel time to reaching peak temperature, and the level of the peak temperature (higher peak temperature generally results in better curing) are important. In addition, the compositions according to the present invention can be obtained with reduced gel-time drift tendency.

Furthermore the inventors have surprisingly found that besides the good curing properties also cured objects with low amounts of residual styrene and residual benzaldehyde can be obtained.

As used herein, the acid value of the resin composition is determined titrimetrically according to ISO 2114-2000. As used herein, the molecular weight of the resin is determined using gel permeation chromatography according to ISO 13885-1.

U.S. Pat. No. 4,524,177 discloses that copper compounds in an amounts from 0.0005 to 0.2% by weight, preferably from 0.001 to 0.05% by weight, based on the ethylenically unsaturated compound to be polymerized, can be used for basic stabilization of the ethylenically unsaturated compounds to be polymerized. Thus, this document teaches that copper is an inhibitor. Similar, GB834286 teaches that small amounts of a soluble form of copper in the range 0.25 ppm to 10 ppm of copper improves the inhibiting properties of inter alias aromatic amines, quaternary ammonium salts and amine salts. U.S. Pat. No. 6,329,475 furthermore teaches that an amine acts as an inhibitor for catalyst composition containing copper. Thus, there appears no indication in these prior art that acceleration can be achieved with a N-containing organic base selected from an amine compound and/or an ammonium salt and copper. However, WO-A-9012824 discloses an accelerator composition for the curing of unsaturated polyester resins comprising a complex of certain metal salts with organic nitrogen compounds. Preferably, the metal is selected from copper, vanadium, lithium, nickel, iron, magnesium and cobalt. For copper, an amount of from 0.1 to 10 ppm is mentioned. Furthermore, according to this document, higher amounts of copper do not further contribute to the activity. It has however been found that such low amounts of copper does not result in efficient curing, whereas the use of copper in an amount of at least 50 ppm in combination with a N-containing organic base can result in efficient curing.

The unsaturated polyester resin or vinyl ester resin as is comprised in the compositions according to the present invention, may suitably be selected from the unsaturated polyester resins or vinyl ester resin as are known to the skilled man. Examples of suitable unsaturated polyester or vinyl ester resins to be used as basic resin systems in the resins of the present invention are, subdivided in the categories as classified by Malik et al., cited above.

(1) Ortho-resins: these are based on phthalic anhydride, maleic anhydride, or fumaric acid and glycols, such as 1,2-propylene glycol, ethylene glycol, diethylene glycol, triethylene glycol, 1,3-propylene glycol, dipropylene glycol, tripropylene glycol, neopentyl glycol or hydrogenated bisphenol-A. Commonly the ones derived from 1,2-propylene glycol are used in combination with a reactive diluent such as styrene.

(2) Iso-resins: these are prepared from isophthalic acid, maleic anhydride or fumaric acid, and glycols. These resins may contain higher proportions of reactive diluent than the ortho resins.

(3) Bisphenol-A-fumarates: these are based on ethoxylated bisphenol-A and fumaric acid.

(4) Chlorendics: are resins prepared from chlorine/bromine containing anhydrides or phenols in the preparation of the UP resins.

(5) Vinyl ester resins: these are resins, which are mostly used because of their because of their hydrolytic resistance and excellent mechanical properties, as well as for their low styrene emission, are having unsaturated sites only in the terminal position, introduced by reaction of epoxy resins (e.g. diglycidyl ether of bisphenol-A, epoxies of the phenol-novolac type, or epoxies based on tetrabromobisphenol-A) with (meth)acrylic acid. Instead of (meth)acrylic acid also (meth)acrylamide may be used.

Besides these classes of resins also so-called dicyclopentadiene (DCPD) resins can be distinguished as unsaturated polyesters. As used herein, a vinyl ester resin is a (meth) acrylate functional resin. Besides the vinyl ester resins as described in Malik et al., also the class of vinyl ester urethane resins (also referred to urethane methacylate resins) can be distinguished as vinyl ester resins. Preferably, the vinyl ester used in the present invention is a resin obtained by the esterification of an epoxy resin with (meth)acrylic acid or (meth)acrylamide.

All of these resins, as can suitably used in the context of the present invention, may be modified according to methods known to the skilled man, e.g. for achieving lower acid number, hydroxyl number or anhydride number, or for becoming more flexible due to insertion of flexible units in the backbone, etc. The class of DCPD-resins is obtained either by modification of any of the above resin types by Diels-Alder reaction with cyclopentadiene, or they are obtained alternatively by first reacting maleic acid with dicyclopentadiene, followed by the resin manufacture as shown above.

Of course, also other reactive groups curable by reaction with peroxides may be present in the resins, for instance reactive groups derived from itaconic acid, citraconic acid and allylic groups, etc. Accordingly, the unsaturated polyester resins or vinyl ester resins used in the present invention may contain solvents. The solvents may be inert to the resin system or may be reactive therewith during the curing step. Reactive solvents are particularly preferred. Examples of suitable reactive solvents are styrene, α-methylstyrene, (meth)acrylates, N-vinylpyrrolidone and N-vinylcaprolactam.

The unsaturated polyester resins and vinyl ester resins as are being used in the context of the present invention may be any type of such resins, but preferably are chosen from the group of DCPD-resins, iso-phthalic resins and ortho-phthalic resins and vinyl ester resins. More detailed examples of resins belonging to such groups of resins have been shown in the foregoing part of the specification. More preferably, the resin is an unsaturated polyester resin preferably chosen from the group of DCPD-resins, iso-phthalic resins and ortho-phthalic resins.

The resin composition of the two-component composition according to the present invention generally contains less than 5 wt. % water.

The resin composition contains less than 0.01 mmol cobalt per kg primary resin system. Preferably, the resin composition contains less than 0.001 mmol Co per kg primary resin system. Most preferably the resin composition is free of cobalt.

According to the invention, the copper$^{2+}$ compound present in the resin composition is preferably a copper salt or complex. Even more preferably, the copper compound is a copper$^{2+}$ salt. In view of the solubility of the copper compound in the resin composition, the copper compound is preferably an organo soluble copper compound like for instance copper carboxylates, copper acetoacetates and copper chlorides. It will be clear that, instead of a single copper compound also a mixture of copper compounds can be used.

The copper is present in the resin composition in an amount of at least 50 ppm (relative to the primary resin system) (0.8 mmol Cu per kg of primary resin system), preferably in an amount of at least 100 ppm Cu. The upper limit of the copper content is not very critical, although for reasons of cost efficiency of course no extremely high concentrations will be applied. Generally the concentration of the copper compound in the primary resin system will be such that the copper is present in an amount lower than 1000 ppm Cu (relative to the primary resin system) (16 mmol Cu per kg of primary resin system), preferably lower than 500 ppm Cu.

For understanding of the invention, and for proper assessment of the amounts of copper compound to be present in the resin composition, the term "primary resin system" as used herein is understood to mean the total weight of the resin, but excluding any fillers as may be used when applying the resin system for its intended uses. The primary resin system therefore consists of the unsaturated polyester resin or vinyl ester resin, any additives present therein (except for the peroxide component that is to be added shortly before the curing) soluble in the resin, such as accelerators, promoters, inhibitors, low-profile agents, colorants (dyes), thixotropic agents, release agents etc., as well as styrene and/or other solvents as may usually be present therein. The amount of additives soluble in the resin usually may be as from 1 to 25 wt. % of the primary resin system; the amount of styrene and/or other solvent may be as large as up to 50 wt. % of the primary resin system. The primary resin system, however, explicitly does not include compounds not being soluble therein, such as fillers (e.g. glass or carbon fibers), talc, clay, solid pigments (such as, for instance, titanium dioxide (titanium white)), flame retardants, e.g. aluminum oxide hydrates, etc.

The N-containing organic base of the resin composition is an amine compound having the following formula:

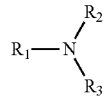

or is an ammonium salt having the following formula $R^1R^2R^3N^+H$ whereby $R^1$, $R^2$ and $R^3$ each individually may represent hydrogen (H), $C_1$-$C_{20}$ alkyl, $C_5$-$C_{20}$ cycloalkyl or $C_7$-$C_{20}$ alkylaryl, that each optionally may contain one or more hetero-atoms (e.g. oxygen, phosphor or sulphur atoms) and/or substituents and a ring may be present between $R_1$ and $R_2$, $R_2$ and $R_3$ and/or $R_1$ and $R_3$, which may contain heteroatoms. In a preferred embodiment, $R^1$, $R^2$ and $R^3$ each individually may represent hydrogen (H), $C_1$-$C_{20}$ alkyl or $C_7$-$C_{20}$ alkylaryl, that each optionally may contain one or more hetero-atoms (e.g. oxygen, phosphor or sulphur atoms) and/or substituents In a preferred embodiment, $R^1$, $R^2$ and $R^3$ are hydrogen. In another preferred embodiment, $R^1$, $R^2$ and $R^3$ each individually may represent a $C_1$-$C_{20}$ alkyl. In yet another preferred embodiment, at least one of $R^1$, $R^2$ and $R^3$ is an alkyl-O—$R^4$ group, whereby $R^4$ is hydrogen, a $C_1$-$C_{20}$ alkyl group or a ring is present between $R^4$ and at least one of the other R groups. In this preferred embodiment, the —O—$R^4$ group is preferably in the R-position with respect to the nitrogen atom.

Preferably, the amount of the N-containing organic base is from 0.05 to 5% by weight, calculated on the total weight of the primary resin system. More preferably, the amount of the N-containing organic base is from 0.1 to 2% by weight; even more preferably between 0.25 and 1% by weight.

In the resin composition, the molar ratio between the copper and the basic functionality of the base is preferably from 40:1 to 1:125, more preferably from 8:1 to 1:25.

The peroxide compound present in the second component of the two-component composition according to the present invention is used for the initiation of curing the resin and can be any peroxide known to the skilled man for being used in curing of unsaturated polyester resins or vinyl ester resins. Such peroxides include organic and inorganic peroxides, whether solid or liquid; also hydrogen peroxide may be applied. Examples of suitable peroxides are, for instance, peroxy carbonates (of the formula —OC(O)O—), peroxyesters (of the formula —C(O)OO—), diacylperoxides (of the formula —C(O)OOC(O)—), dialkylperoxides (of the formula —OO—), etc The peroxides can also be oligomeric or polymeric in nature. An extensive series of examples of suitable peroxides can be found, for instance, in US 2002/0091214-A1, paragraph [0018]. The skilled man can easily obtain information about the peroxides and the precautions to be taken in handling the peroxides in the instructions as given by the peroxide producers.

Preferably, the peroxide is chosen from the group of organic peroxides. Examples of suitable organic peroxides are: tertiary alkyl hydroperoxides (such as, for instance, t-butyl hydroperoxide), other hydroperoxides (such as, for instance, cumene hydroperoxide), the special class of hydroperoxides formed by the group of ketone peroxides (perketones, being an addition product of hydrogen peroxide and a ketone, such as, for instance, methyl ethyl ketone peroxide and acetylacetone peroxide), peroxyesters or peracids (such as, for instance, t-butyl peresters, benzoyl peroxide, peracetates and perbenzoates, lauryl peroxide, including (di)peroxyesters), -perethers (such as, for instance, peroxy diethyl ether). Often the organic peroxides used as curing agent are tertiary peresters-or tertiary hydroperoxides, i.e. peroxy compounds having tertiary carbon atoms directly united to an —O-acyl or —OOH group. Clearly also mixtures of these peroxides with other peroxides may be used in the context of the present invention. The peroxides may also be mixed peroxides, i.e. peroxides containing any two of different peroxygen-bearing moieties in one molecule). In case a solid peroxide is being used for the curing, the peroxide is preferably benzoyl peroxide (BPO). In case the peroxide is a peranhydride, the resin composition preferably does not contain a tertiary aromatic amine.

Most preferably, however, the peroxide is a liquid hydroperoxide. The liquid hydroperoxide, of course, also may be a mixture of hydroperoxides. Handling of liquid hydroperoxides when curing the resins for their final use is generally easier: they have better mixing properties and dissolve more quickly in the resin to be cured.

In particular it is preferred that the peroxide is selected from the group of ketone peroxides, a special class of hydroperoxides. The peroxide being most preferred in terms of handling properties and economics is methyl ethyl ketone peroxide (MEK peroxide).

In a preferred embodiment of the invention, the resin composition also contains one or more reactive diluents. Preferably the amount of reactive diluents is at least 5 weight %.

Such reactive diluents are especially relevant for reducing the viscosity of the resin in order to improve the resin handling properties, particularly for being used in techniques like vacuum injection, etc. However, the amount of such reactive diluents in the resin composition according to the invention is not critical. Preferably, the reactive diluent is a methacrylate and/or styrene.

In a further preferred embodiment of the present invention, the resin composition also contains one or more radical inhibitors. More preferably, the resin compositions according to the invention contain one or more radical inhibitors preferably chosen from the group of phenolic compounds, stable radicals like galvinoxyl and N-oxyl based compounds, catechols and/or phenothiazines.

The amount of radical inhibitor as used in the context of the present invention, may, however, vary within rather wide ranges, and may be chosen as a first indication of the gel time as is desired to be achieved. Preferably, the amount of phenolic inhibitor is from about 0.001 to 35 mmol per kg of primary resin system, and more preferably it amounts to more than 0.01, most preferably more than 0.1 mmol per kg of primary resin system. The skilled man quite easily can assess, in dependence of the type of inhibitor selected, which amount thereof leads to good results according to the invention.

Suitable examples of radical inhibitors that can be used in the resin compositions according to the invention are, for instance, 2-methoxyphenol, 4-methoxyphenol, 2,6-di-t-butyl-4-methylphenol, 2,6-di-t-butylphenol, 2,4,6-trimethylphenol, 2,4,6-tris-dimethylaminomethyl phenol, 4,4'-thio-bis(3-methyl-6-t-butylphenol), 4,4'-isopropylidene diphenol, 2,4-di-t-butylphenol, 6,6'-di-t-butyl-2,2'-methylene di-p-cresol, hydroquinone, 2-methylhydroquinone, 2-t-butylhydroquinone, 2,5-di-t-butylhydroquinone, 2,6-di-t-butylhydroquinone, 2,6-dimethylhydroquinone, 2,3,5-trimethylhydroquinone, catechol, 4-t-butylcatechol, 4,6-di-t-butylcatechol, benzoquinone, 2,3,5,6-tetrachloro-1,4-benzoquinone, methylbenzoquinone, 2,6-dimethylbenzoquinone, napthoquinone, 1-oxyl-2,2,6,6-tetramethylpiperidine, 1-oxyl-2,2,6,6-tetramethylpiperidine-4-ol (a compound also referred to as TEMPOL), 1-oxyl-2,2,6,6-tetramethylpiperidine-4-one (a compound also referred to as TEMPON), 1-oxyl-2,2,6,6-tetramethyl-4-carboxyl-piperidine (a compound also referred to as 4-carboxy-TEMPO), 1-oxyl-2,2,5,5-tetramethylpyrrolidine, 1-oxyl-2,2,5,5-tetramethyl-3-carboxylpyrrolidine (also called 3-carboxy-PROXYL), aluminium-N-nitrosophenyl hydroxylamine, diethylhydroxylamine, phenothiazine and/or derivatives or combinations of any of these compounds.

Advantageously, the amount of radical inhibitor in the resin composition according to the invention is in the range of from 0.0001 to 10% by weight, calculated on the total weight of the primary resin system of the resin composition. More preferably, the amount of radical inhibitor in the resin composition is in the range of from 0.001 to 1% by weight.

The two-component composition according to the present invention can be applied in all applications as are usual for such types of resins. In particular they can suitably used in closed mould applications, but they also can be applied in open mould applications. For closed mould applications it is especially important that the manufacturer of the closed mould products reliably can use the favorable (i.e. reduced) gel-time drift tendency of the resin compositions according to the invention. End segments where the unsaturated polyester resin or vinyl ester resin compositions according to the present invention can be applied are also marine applications, chemical anchoring, roofing, construction, relining, pipes & tanks, flooring, windmill blades, etc. That is to say, the resin compositions according to the invention can be used in all known uses of unsaturated polyester resins and vinyl ester resins.

The present invention further also relates to a process for radically curing a two-component composition according to the invention by effecting the curing essentially free of cobalt, more preferably in the absence of cobalt. Essentially free of cobalt means that the cobalt concentration in the resin composition is less than 0.01 mmol cobalt per kg primary resin system. It has surprisingly been found that the combination of the copper$^{2+}$ compound in an amount as defined above and the N containing organic base as defined above accelerates the radically curing of the unsaturated polyester or vinyl ester with the peroxide. Preferably, the curing is effected at a temperature in the range of from −20 to +200° C., preferably in the range of from −20 to +100° C., and most preferably in the range of from −10 to +60° C. (so-called cold curing).

The present invention further also relates to all such objects or structural parts as are being obtained when curing the unsaturated polyester resin or vinyl ester resin compositions. These objects and structural parts have excellent mechanical properties. The present invention further also relates to a pre-accelerated resin composition being curable with a peroxide compound as described above.

The invention is now demonstrated by means of a series of examples and comparative examples. All examples are supportive of the scope of claims. The invention, however, is not restricted to the specific embodiments as shown in the examples.

EXPERIMENTAL PART

The resins used for curing are commercially available products from DSM Composite Resins B.V., Schaffhausen, Switzerland, and in addition thereto also a resin—hereinafter referred to as Resin A—was specifically prepared on behalf of the inventors for being used in the tests. The peroxides used for curing are commercially available products from Akzo Nobel Inc.

Preparation of Resin A 184.8 g of propylene glycol (PG), 135.8 g of diethylene glycol (DEG), 216.1 g of phthalic anhydride (PAN), 172.8 g of maleic anhydride (MAN), and 0.075 g 2-t-butylhydroquinone were charged in a vessel equipped with a reflux condenser, a temperature measurement device and inert gas inlet. The mixture was heated slowly by usual methods to 205° C. At 205° C. the mixture was kept under reduced pressure until the acid value reached a value below 16 mg KOH/g resin and the falling ball viscosity at 100° C. was below 50 dPa·s. Then the vacuum was relieved with inert gas, and the mixture was cooled down to 130° C., and thereafter the solid UP resin so obtained was transferred to a mixture of 355 g of styrene and 0.07 g of mono-t-butylhydroquinone and was dissolved at a temperature below 80° C. The final resin viscosity reached at 23° C. was 640 mPa·s, and the Non Volatile Matter content was 64.5 wt. %.

Monitoring of Curing

In most of the Examples and Comparative Examples presented hereinafter it is mentioned, that curing was monitored by means of standard gel time equipment. This is intended to mean that both the gel time ($T_{gel}$ or $T_{25 \to 35° C.}$) and peak time ($T_{peak}$ or $T_{25 \to peak}$) were determined by exotherm measurements according to the method of DIN 16945 when curing the resin with the peroxides as indicated in the Examples and Comparative Examples. The equipment used therefore was a Soform gel timer, with a Peakpro software package and National Instruments hardware; the waterbath and thermostat used were respectively Haake W26, and Haake DL30.

For some of the Examples and Comparative Examples also the gel-time drift (Gtd) was calculated. This was done on the basis of the gel times determined at different dates of curing according to formula 1:

$$Gtd = (T_{25 \to 35° C. \text{ at } y\text{-days}} - T_{25 \to 35° C. \text{ after mixing}}) / T_{25 \to 35° C. \text{ after mixing}} \times 100\%$$ (formula 1)

with "y" indicating the number of days after mixing.

EXAMPLES 1a-d AND COMPARATIVE EXPERIMENTS A-J

To a mixture of 90 g resin A, 10 g styrene and 1 g isophorone diamine was added a copper salt in various amounts and cured with peroxide at 25° C. The cure was monitored with the gel time equipment and the results are shown in table 1.

TABLE 1

| | | Copper | | peroxide | | Cure | | |
| | | | | Butanox | Trigonox | Tgel | Tpeak | temp |
| Ex | Type | g | ppm | M-50 (g) | C (g) | (min) | (min) | (° C.) |
|---|---|---|---|---|---|---|---|---|
| comp a | CuCl$_2$ | 0.0002 | 1 | 1 | 1 | >1200 | | |
| comp b | | 0.0002 | 1 | 2 | 0 | >1200 | | |
| comp c | | 0.0021 | 10 | 1 | 1 | >1200 | | |
| comp d | | 0.0021 | 10 | 2 | 0 | >1200 | | |
| comp e | Cu | 0 | 0 | 1 | 1 | >1200 | | |
| comp f | naphtenate | 0.0012 | 1 | 1 | 1 | >1200 | | |
| comp g | (8% Cu) | 0.0012 | 1 | 2 | 0 | >1200 | | |
| comp h | | 0.0125 | 10 | | 2 | >1200 | | |
| comp I | | 0.0125 | 10 | 1 | 1 | >1200 | | |
| comp j | | 0.0125 | 10 | 2 | 0 | >1200 | | |
| 1a | | 0.0625 | 50 | 2 | 0 | 49.8 | 67.6 | 152 |
| 1b | | 0.125 | 100 | 2 | 0 | 20.5 | 30.2 | 170 |
| 1c | | 0.25 | 200 | 2 | 0 | 7.4 | 13.6 | 182 |
| 1d | | 0.5 | 400 | 2 | 0 | 3.1 | 8.3 | 175 |

These examples and the comparative experiments clearly demonstrate that using the low amounts of copper according to WO-A-9012824 no curing takes place. Only when using the high amounts of copper according to the present invention an efficient curing takes place.

EXAMPLES 2a-d

Examples 1a-d were repeated except that 1% Koctanoate in PEG (15%) was also added. Curing was performed with 2% (relative to the primary resin system) Butanox M-50 and recorded in the gel time equipment. The results are shown in the next table.

TABLE 2

| | Cu (g) | Ppm | Tgel (min) | Tpeak (min) | temp (° C.) |
|---|---|---|---|---|---|
| 2a | 0.0625 | 50 | 24.5 | 33.8 | 169 |
| 2b | 0.125 | 100 | 7.2 | 12.7 | 182 |
| 2c | 0.25 | 200 | 4.7 | 9.4 | 181 |
| 2d | 0.5 | 400 | 2 | 6.2 | 178 |

These results indicate that the cure efficiency using high amounts of copper can be further enhanced by the addition of a potassium salt

EXAMPLES 3a-g AND COMPARATIVE EXPERIMENTS K AND L

Formulations were prepared based on 0.25 g Cu naphtenate (200 ppm), 1 g ligand, 10 g styrene and 90 g resin A. After stirring for 5 min the formulations were cured using 2 or 3% (relative to the primary resin system) Butanox M-50 and monitored using the gel time equipment. The results are shown in the next table.

TABLE 3

|   | Ligand | M-50 (%) | Tgel (min) | Tpeak (min) | temp (° C.) |
|---|---|---|---|---|---|
| 3° | ammonia | 3 | 1.1 | 4 | 170 |
| 3b | triethylamine | 2 | 15 | 26 | 130 |
| 3c | dimethylbenzylamine | 2 | 56 | 79 | 109 |
| 3d | ethanol amine | 3 | 4.4 | 8.6 | 195 |
| 3e | N-methyl ethanolamine | 3 | 12 | 19 | 170 |
| 3f | N,N-dimethyl ethanol amine | 3 | 4.2 | 8.1 | 179 |
| 3g | N,N-diethyl ethanol amine | 3 | 5.6 | 10.2 | 188 |
| 3h | N,N-dibutyl ethanol amine | 2 | 9 | 14 | 160 |
| 3i | 1-amino-2-propanol | 2 | 19.6 | 27 | 162 |
| 3j | Choline chloride | 3 | 14 | 31 | 133 |
| 3k | morpholine | 3 | 2.9 | 7.9 | 117 |
| 3l | N-methyl morpholine | 3 | 17.7 | 34.4 | 124 |
| 3m | ethylene diamine | 3 | 47 | 78 | 42 |
| 3n | tetramethyl ethylen diamine | 3 | 144 | 187 | 48 |
| Comp k | glycol | 3 | >1200 | | |
| Comp l | dimethyl glycol | 3 | >1200 | | |

These results indicate that most amines are efficient. The most effective appear to be ammonia and amines with a β-hydroxy or alkoxy group.

EXAMPLES 4a-e

Examples 3d, 3f, 3g, 3k and 3l were repeated except that also 0.008 g t-butyl cathecol was added. The cure results are shown in the next table.

TABLE 4

| Example | ligand | Tgel (min) | Tpeak (min) | temp (° C.) |
|---|---|---|---|---|
| 4a | ethanol amine | 9.3 | 14.6 | 191 |
| 4b | N,N-dimethyl ethanol amine | 8.4 | 12.5 | 178 |
| 4c | N,N-diethyl ethanol amine | 8.7 | 13.4 | 191 |
| 4d | morpholine | 4.9 | 10.3 | 175 |
| 4e | N-methyl morpholine | 28.9 | 42.2 | 130 |

These examples together with examples 3d, 3f, 3g, 3k and 3l demonstrate that the curing according to the invention can be tuned using radical inhibitors

EXAMPLES 5a-l

Formulations were prepared using 100 g of various resin systems, 0.008 g t-butyl catechol, 0.25 g Cu naphtenate solution and 1 g N,N-dimethylethanol amine. Curing was performed using 3% (relative to primary resin system) Butanox M-50 and monitored using the gel timer the results are shown in the next table.

TABLE 5

| | resin (g) | styrene (g) | Tgel (min) | Tpeak (min) | temp (° C.) |
|---|---|---|---|---|---|
| 5a | A (90) | 10 | 7.3 | 11.3 | 177 |
| 5b | Palatal P 69-02 (90) | 10 | 25.2 | 32 | 165 |
| 5c | Palatal P 4-01 (90) | 10 | 57.1 | 72 | 113 |
| 5d | Palatal P 6-01 (90) | 10 | 18.6 | 24 | 153 |
| 5e | Daron XP-45-A-2 | | 12.7 | 20 | 162 |
| 5f | Synolite 8388-N-1 | | 52.4 | 71 | 125 |

The same experiments, however without t-butyl catechol were repeated using morpholine instead of n,n-dimethyl ethanol amine and the results are shown below.

TABLE 6

| | resin (g) | styrene (g) | Tgel (min) | Tpeak (min) | temp (° C.) |
|---|---|---|---|---|---|
| 5g | A (90) | 10 | 4 | 8 | 176 |
| 5h | Palatal P 69-02 (90) | 10 | 8 | 12 | 179 |
| 5i | Palatal P 4-01 (90) | 10 | 23 | 33 | 118 |
| 5j | Palatal P 6-01 (90) | 10 | 31 | 38 | 162 |
| 5k | Daron-XP-45-A-2 | | 16 | 23 | 145 |
| 5l | Synolite 8388-N-1 | | 28 | 39 | 118 |

These examples in which various amines were used, illustrate that all types of unsaturated resins i.e. unsaturated polyesters, vinyl esters and DCPD resins can be cured according to the invention

EXAMPLE 6

Example 5a was repeated on a 200 g scale. The resin formulation was divided into 2 portions of 100 g each. The first portion was cured 5 min after mixing and the results are similar to above. The second portion was cured after 84 days resulting in a Tgel=7.2 min, Tpeak=12 min, peak temp=171° C. The gel time drift of this formulation after 84 days was −1%.

For comparison example 6 was repeated with 0.4 g cobalt naphtenate (10% in spirits) instead of copper naphtenate and dimethyl ethanol amine. This experiment resulted in a gel time drift of 90% after 84 days.

This example illustrates that drift free resins can be obtained using the cure system according to the invention.

EXAMPLE 7

Formulations were prepared using 90 g resin A, 10 g styrene, 0.25 g Cu naphtenate solution and 1 g N,N-dimethylethanol amine (examples 7a-7e) respectively 1 g ammonia (30% in water) (examples 7f-7i) respectively 1 g ammonium acetate (71% in water) (examples 7j-7k). Curing was performed using 3% (relative to the primary resin system) of various peroxides and monitored using the gel timer. The results are shown in the next table.

TABLE 7

| Example | | Tgel (min) | Tpeak (min) | temp (° C.) |
|---|---|---|---|---|
| 7a | Trigonox 21 | 309 | 327 | 146 |
| 7b | Trigonox C | 340 | 357 | 149 |
| 7c | Cyclonox LE 50 | 4.7 | 7.7 | 148 |
| 7d | Perkadox 50L | 121 | 129 | 117 |
| 7e | H2O2, 30% in water | 4 | 8.4 | 204 |
| 7f | Butanox M-50 | 3 | 9 | 184 |

TABLE 7-continued

| Example | | Tgel (min) | Tpeak (min) | temp (° C.) |
|---|---|---|---|---|
| 7g | Trigonox 44B | 10 | 15 | 152 |
| 7h | Cyclonox LE 50 | 3 | 8 | 170 |
| 7i | H2O2, 30% in water | 252 | 284 | 123 |
| 7j | Butanox M-50 | 5 | 13 | 176 |
| 7k | Trigonox 44B | 7 | 12 | 152 |

These results indicate that various peroxides can be used. Moreover they indicate that the type of peroxide can be used to tune the curing. In addition, the results indicate that with a proper selection of peroxide with amine the gel time can be tuned.

EXAMPLE 8

A formulation was prepared from 60 g of a styrene free resin Synolite 0513-N-0, 40 g vinyl neodecanoate, 0.175 g Cu naphtenate solution (8% Cu) and 0.9 g N,N-dimethyl ethanol amine. Curing was performed with 2% (relative to the primary resin system) Butanox M-50 resulting in the following cure characteristics: Tgel=5.8 min, Tpeak=11.5 min, Peak temp=101° C.

This result indicates that styrene free resins can be cured according to the invention

EXAMPLE 9

A formulation was prepared from 1250 g resin A, 125 g styrene, 2.13 g copper naphtenate solution (8% Cu) and 18.4 g N,N-dimethyl ethanol amine. After stirring for 5 min. a portion of 100 g was used for measuring the gel time using 2% (relative to the primary resin system) Butanox M-50: Tgel=10.9 min, T peak =16.1 min and peak temp=157° C.

Separately 360 g of the resin formulation was mixed with 170 glass Vetrotex M-123, 450 g/m². To this mixture 7.2 g Butanox M-50 was added and a laminate was prepared with increasing layer-thickness of 2, 4 and 6 plies respectively. After 15 min the laminates reached the gel point and after 38 min the layer of 6 plies reached a peak temperature of 51° C. Through-cure of the laminates was monitored via the surface hardness and the results are shown below.

TABLE 8

| | Hardness (Shore D/Barcol GYZJ 934-1) | | |
|---|---|---|---|
| Time | 2 plies | 4 plies | 6 plies |
| 1 hr | D60 | D65 | D75 |
| 2 hr | D70 | 10 | 20 |
| 3 hr | 5 | 20 | 25 |

These results illustrate that laminates, to be used for construction purposes can be obtained with the cure system according to the invention.

EXAMPLE 10

4 mm castings were prepared based on 500 g resin A according to the formulations described below (all amounts are in grams) and cured with Butanox M-50. The 4 mm castings were made between hardened borosilicate glass that was separated with a 4 mm EPDM U-shaped rim The casting were released and post cured during 24 hrs at 60° C. and 24 hrs at 80° C. Mechanical properties of the cured objects were determined according to ISO 527-2. The Heat Distortion Temperature (HDT) was measured according to ISO 75-Ae. Residual styrene contents were measured by gaschromatography using GC-FID (Gas Chromatography with a Flame Ionization Detector), using butylbenzene as an internal standard, after extraction of the cured objects in dichloromethane for 48 hrs.

TABLE 9

| | 10a | 10b | 10c | 10d |
|---|---|---|---|---|
| resin A | 500 | 500 | 500 | 500 |
| Cu Naphtenate (8% Cu) | 0.672 | 0.672 | 0.673 | 0.671 |
| Ammonium acetate (60% in water) | 3.40 | | | 3.42 |
| Ammonia (28-30% in water) | | 2.31 | | |
| N,N-dimethyl ethanol amine | | | 4 | |
| t-butylcatechol | | | | 0.025 |
| Butanox M50 | 5.0 | 5.0 | 5.1 | 4.9 |
| HDT (° C.) | 70 | 73 | 70 | 70 |
| Tens (MPa) | 88 | 75 | 90 | 86 |
| Emod (GPa) | 3.7 | 3.8 | 3.7 | 3.6 |
| Elongation at Break (%) | 4.4 | 2.6 | 4.8 | 4.6 |
| Rest styrene (%) | <0.1 | 0.06 | 0.14 | 0.09 |
| Barcol hardness GYZJ 934-1 | 44 | 44 | 45 | 44 |

These castings results further indicate that the cure system according to the invention can be used for construction purposes.

EXAMPLE 11

To 100 grams of Palatal P 4-01 amounts of different bases have been added as listed in Table below (all amounts are in grams). Reactivity was measured and 2- and 4 mm castings were made. The 2 mm castings were cured in an open mould with the top side in contact with air. The 4 mm castings were made between hardened borosilicate glass that was separated with a 4 mm EPDM U-shaped rim. After 24 hrs at 20° C. part of the material was post-cured.

Mechanical properties of the cured objects were determined according to ISO 527-2. The Heat Distortion Temperature (HDT) was measured according to ISO 75-Ae. Residual styrene and benzaldehyde contents were measured by gaschromatography using GC-FID (Gas Chromatography with a Flame Ionization Detector), using butylbenzene as an internal standard, after extraction of the cured objects in dichloromethane for 48 hrs.

TABLE 10

| | 11a | 11b | Comp m | Comp n |
|---|---|---|---|---|
| Triethanolamine | 0.3647 | | | |
| Diethanolamine | | 0.2686 | | |
| N,N-Diethylacetoacetamide | 1 | 1 | 1 | |
| Coppernaphtenate Cu 8% | 0.27 | 0.27 | 0.27 | |
| p-tert-butylcatechol (ppm) | 200 | 200 | | |
| Cobalt-2-ethylhexanoate (Co 10%) | | | | 1.5 |
| Butanox M-50 | 2 | 2 | 2 | 2 |
| Gel time (min) | 36 | 19 | 93.6 | 6.4 |
| Peak time (min) | 43.1 | 24.2 | 123 | 19.2 |
| Peakexotherm (° C.) | 115 | 116 | 90 | 136 |
| Barcol hardness casting 2 mm after 7 days Bottomside | 35 | 35 | 25 | 33 |
| Barcol hardness casting 2 mm after 7 days Topside | 44 | 45 | 35 | 38 |
| Barcol hardness casting 4 mm Post cured 16 hrs 40° C. | 45 | 44 | 42 | 45 |

TABLE 10-continued

|  | 11a | 11b | Comp m | Comp n |
|---|---|---|---|---|
| Rest styrene casting 4 mm post cured 16 hrs 40° C. (%) | 0.34 | 0.465 | 0.535 | 1.2 |
| Rest benzaldehyde casting 4 mm Post cured 16 hrs 40° C. (%) | 0.003 | 0.003 | 0.005 | 0.07 |

The results clearly indicate that good and efficient curing, being indicated by short geltimes and high Barcol hardness of the cured object, combined with low amounts of residues can only be obtained when the resin composition both contains copper and amine.

The invention claimed is:

1. A two-component composition comprising a first component and a second component, wherein
the first component is a pre-accelerated resin composition having an acid value in the range of from 0.001-300 mg KOH/g of resin composition, the resin composition comprising (i) an unsaturated polyester resin having a molecular weight in a range of 500 to 200,000 g/mole, (ii) an accelerator consisting essentially of a copper$^{2+}$ compound in an amount of at least 50 ppm, based on the primary resin system, and (iii) at least one N-containing organic base selected from an amine compound and/or an ammonium salt; wherein the amine compound has the following formula:

and the ammonium salt has the following formula:

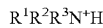

whereby $R^1$, $R^2$ and $R^3$ each individually may represent hydrogen (H), $C_1$-$C_{20}$ alkyl, $C_5$-$C_{20}$ cycloalkyl or $C_7$-$C_{20}$ alkylaryl, that each optionally may contain one or more hetero-atoms and/or substituents and a ring may be present between $R_1$ and $R_2$, $R_2$ and $R_3$ and/or $R_1$ and $R_3$, which may contain heteroatoms, wherein
the second component comprises a peroxide compound, and wherein
the two-component composition contains less than 0.01 mmol cobalt per kg primary resin system, and wherein a molar ratio between the copper and basic functionality of the base is from 40:1 to 1:125.

2. The two-component composition according to claim 1, wherein the copper$^{2+}$ compound is a copper carboxylate or a copper acetoacetate.

3. The two-component composition according to claim 1, wherein the copper$^{2+}$ compound is present in an amount of at least 100 ppm relative to the primary resin system.

4. The two-component composition according to claim 1, wherein $R^1$, $R^2$ and $R^3$ arehydrogen.

5. The two-component composition according to claim 1, wherein $R^1$, $R^2$ and $R^3$ each individually may represent a $C_1$-$C_{20}$ alkyl.

6. The two-component composition according to claim 1, wherein at least one of $R^1$, $R^2$ and $R^3$ is an alkyl-O—$R^4$ group, whereby $R^4$ is hydrogen, a $C_1$-$C_{20}$ alkyl group or a ring is present between $R^4$ and at least one of the other R groups.

7. The two-component composition according to claim 6, wherein the-O—$R^4$ group is in the β-position with respect to the nitrogen atom.

8. The two-component composition according to claim 1, wherein the amount of the N-containing organic base is from 0.05 to 5% by weight, calculated on the total weight of the primary resin system.

9. The two-component composition according to claim 1, wherein the resin composition further comprises a radical inhibitor.

10. Cured structural parts obtained by curing a two-component composition according to claim 1.

11. A process which comprises radically curing a two-component composition according to claim 1 in the absence of cobalt.

12. The process according to claim 11, wherein the peroxide compound is at least one selected from the group consisting of hydroperoxides, perethers and perketones.

13. The process according to claim 12, wherein the peroxide compound is methylethylketone peroxide.

14. The two-component composition according to claim 9, wherein the radical inhibitor is at least one selected from the group consisting of phenolic compounds, stable radicals, catechols and phenothiazines.

15. The two-component composition according to claim 1, wherein the accelerator consists of the copper$^{2+}$ compound.

16. previously presented) The two-component coposition according to claim 15, wherein the the copper$^{2+}$ compound is a copper carboxylate or a copper acetoacetate.

17. The two-component composition according to claim 16, wherein the resin composition consists of (i) the unsaturated polyester resin, (ii) the copper$^{2+}$ compound, (iii) the at least one N-containing organic base, (iv) and optionally a radical inhibitor.

18. The two-component composition according to claim 17, wherein the N-containing organic base is at least one selected from the group consisting of ammonia, triethylamine, dimethylbenzylamine, ethanol amine, N-methyl ethanolamine, N,N-dimethyl ethanol amine, N,N-diethyl ethanol amine, N,N-dibutyl ethanol amine, 1-amino-2-propanol, choline chloride, morpholine, N-methyl morpholine, ethylene diamine and tetramethyl ethylene diamine.

19. A two-component composition comprising first and second components and less than 0.01 mmol cobalt per kg primary resin system, wherein
(1) the first component is a resin composition having an acid value in the range of from 0.001-300 mg KOH/g of resin composition, the resin composition comprising;
(i) an unsaturated polyester resin having a molecular weight in a range of 500 to 200,000 g/mole,
(ii) an amount of at least 50 ppm, based on the primary resin system, of an accelerator consisting of a copper$^{2+}$ compound selected from the group consisting of a copper carboxylate and a copper acetoacetate, and
(iii) at least one N-containing organic base selected from the group consisting of ammonia, triethylamine, dimethylbenzylamine, ethanol amine, N-methyl ethanolamine, N,N-dimethyl ethanol amine, N,N-diethyl ethanol amine, N,N-dibutyl ethanol amine, 1-amino-2-propanol, choline chloride, morpholine, N-methyl morpholine, ethylene diamine and tetramethyl ethylene diamine, and wherein
(2) the second component comprises a peroxide.

* * * * *